Patented Dec. 14, 1926.

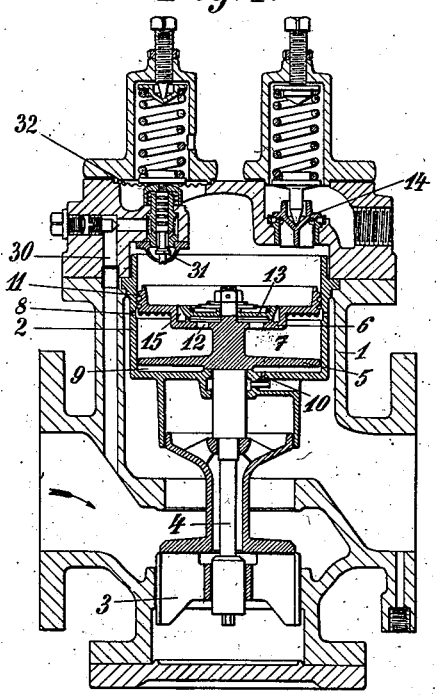

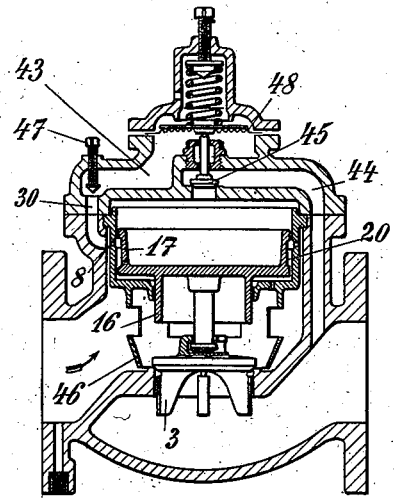

1,611,079

UNITED STATES PATENT OFFICE.

OTTO ROSCHANEK, OF VIENNA, AUSTRIA, ASSIGNOR OF ONE-HALF TO THE FIRM HUEBNER & MAYER, OF VIENNA, AUSTRIA.

PRESSURE CONTROLLER.

Application filed April 9, 1923, Serial No. 631,003, and in Austria April 11, 1922.

This invention relates to pressure controlling valves of that class in which a valve body is connected with a piston acted upon by the fluid under pressure to be controlled. Pressure controlling valves, of this class as heretofore constructed were open to the objection that in most cases no provision is made at all for braking the valve and piston movement, or only an insufficient one so that the parts are liable to vibrate or even to hammer so that they become unserviceable after a short time. Where a more efficient braking is provided for the action of the pressure controlling valve is too slow to be satisfactory and moreover the tightly fitting pistons are liable to stick fast.

The object of this invention is to provide a pressure controlling valve of the kind referred to in which the above objections are avoided, further to provide a pressure controlling valve which promptly responds to any changes of pressure, is simple and cheap in construction, not liable to get out of order, and in which the piston though not tightly fitting its guiding cylinder is securely packed by a liquid packing. In the case of pressure controlling valves used with steam or other vapours the packing may be formed by the condensate of the steam or vapours. With these objects in view the present invention consists of a particular construction and arrangement of the valve body, the piston and the means for operating the same as hereinafter more fully described, with reference to the annexed drawings illustrating by way of example various embodiments of this invention.

In the drawings Figs. 1 to 4 inclusive, are vertical sections of four constructional forms of the pressure controlling valve embodying the present invention.

Fig. 5 shows a modified detail.

Fig. 6 shows another detail of the device illustrated in Fig. 1 in vertical section.

Figure 8:
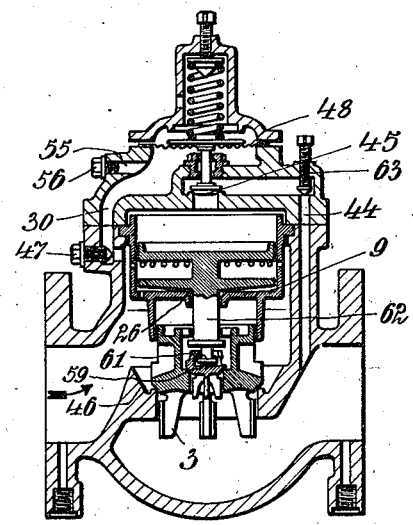

Figs. 7 to 11 inclusive, are vertical sections of modifications of the present pressure controlling valves.

In Fig. 1, in the valve casing 1 a piston guiding cylinder 2 is mounted, in which works the piston connected with the valve body 3 by a rod 4. This rod is provided with an enlargement 59 acting as a relief valve in conjunction with the valve 3. The cylinder 2 extends upwards to the cover of the casing, a cylindrical extension thereof making contact with the joint between the valve casing and its cover so that a packing or parts thereof there placed, cannot interfere with the movements of the piston. The piston consists of two discs 5, 6 between which and the side wall of the piston guiding cylinder there is formed a space 7 which in any position of the piston communicates by openings 8 in the wall of the guiding cylinder with the low pressure side of the valve. The space 9 between the bottom disc 5 of the piston and the bottom of the guiding cylinder 2 serves as a dash pot and communicates by the small opening 10 with the low pressure side of the valve. Owing to this arrangement always equal pressure acts on both sides of the disc 5 so that for any position of the piston an equally good braking action is secured below the disc 5. If steam be used as fluid under pressure then the condensate entering betweeen the sliding face of the piston and the cylindrical wall of the guiding cylinder for the piston, serves as an excellent packing agent which owing to the equality of pressure on both sides cannot escape from the place where it acts as a packing. For rendering this packing by the condensate still more efficient it is advisable to provide the piston sliding surfaces with circumferential grooves as shown at 11 for the upper piston disc 6. By the arrangement of the spaces of equal pressure and of the packing by the condensate it is possible to provide the piston with sliding surfaces of small width only and to fit it loosely only into the piston guiding cylinder. Owing thereto the packed joints become much less sensitive to any foreign bodies which may penetrate thereinto. In those cases where a noncondensing fluid under pressure is used the packing and the brake action may be obtained by a liquid separately poured in or introduced into the grooves on the sliding surfaces. Also the piston rod guides may be packed by means of condensate by providing a circumferential groove 26 within the guide communicating by a passage 27 with the low pressure space so that also in the piston rod guide the same pressure is maintained as in the braking space.

In the upper disc 6 of the piston, openings 12 are provided which are closed by a spring actuated valve 13. When the pressure exceeds a certain permissible value, the valve 13 is lifted and the excess of fluid under pressure escapes from the space 7 and through the safety valve 14 into the atmosphere. This valve 13 is laterally enlarged beyond its seat in the well known manner and so fitted into the disc 6 forming the valve seat that in its closed position an annular space 15 is left between the edge of the valve body and the part of the disc 6 surrounding the valve seat. On opening the valve 13 the fluid under pressure flows into the space 15 and there acts on the enlargement of the valve, so that a rapid lifting of the valve is brought about.

In Fig. 2 another constructional form of the piston embodying the invention is shown. In this case two concentric hollow pistons 16, 17 having a common head or top portions are used, the minor one of which, 16, slides in an inner cylinder 18 concentric to the outer piston guiding cylinder 2. The brake space 9 is in this case formed between the outer piston and the piston guiding cylinder while the hollow space of the inner piston communicates by large openings 19 with the low pressure space and has superimposed upon it the valve 13. The sliding surfaces of the pistons are provided with wide circumferential grooves 20 which permanently communicate with the low pressure space by the openings 8 and 10 so that in this case too the same pressure acts on both sides of the remaining small parts of the sliding surfaces, and the packing by the condensate is secured. The large openings 19 have for their result that the piston and the valve body connected therewith can follow particularly rapidly the varying steam consumption, without vibrations of the same being set up. The annular space 15 bringing about the lifting of the valve 13 is here provided in the enlargement of the valve itself.

In the constructional form shown in Fig. 3 the head of the inner piston 16 is on the same side as the head of the piston guiding cylinder and the hollow spaces of the two concentric pistons are in open communication with each other. The brake space is here situated between the head of the inner piston and the head of the piston guiding cylinder. The entire space between the two pistons and the piston guiding cylinder communicates by the large openings 19 with the low pressure space so that the pressure becomes rapidly operative on the entire piston and the latter can most rapidly follow the steam consumption. A hole 21 in the inner piston 16 leads to its circumferential groove to secure the packing by the condensate in the manner described.

The constructional form shown in Fig. 4 differs from that shown in Fig. 2 in that the walls of the concentric pistons extend in opposite directions from the common head and the inner piston is guided in the head of the piston guiding cylinder.

For the purpose of a rapid lifting the safety valve 14 may be constructed similarly to the valve 13. Fig. 5 shows on a larger scale a constructional form of the safety valve according to the invention. As is seen in this case too the valve is laterally enlarged beyond its seat but the enlargement is formed by a ring 23 screwed on the valve and loosely fitting an annular guide 22; this ring too may be screwed in so that by adjusting the ring 23 or its guide 22; the time of the opening of the valve may be governed.

The arrangement may also be such that the disc 24 transmitting the spring pressure to the valve is also constructed as a sliding valve. For this purpose a guiding sleeve 25 screwed into the cover or spring casing is provided so that by adjusting this sleeve the time of the opening may be governed. In the case of such a construction of the spring actuated disc fluid under pressure does not escape, as in the first named constructional form below the disc at 28, but above the disc at 29.

It is essential for the construction that the adjustable parts 23, 22, 25 are so arranged that they are readily accessible from the outside. Indeed the adjustment may be readily effected through the escape opening 28 by means of a suitable tool.

For governing the pressure exerting fluid flowing through the passage 30 (Fig. 1) there is provided in the casing to the upper side of the piston a governing valve 31 which is operated by a spring actuated diaphragm 32. The construction of this valve which is shown in Fig. 6 on a larger scale constitutes a further part of the invention.

The valve body 31 is connected with a relief guiding piston 33 mounted in a guiding sleeve 34 and provided with a screw threaded extension projecting beyond the guiding sleeve; onto this extension the spring casing 35 is screwed. The sleeve 34 is removably mounted in the cover of the controller and fixed in position by an annular plate 36 screwed on the cover. After unscrewing this plate 36 and the spring casing 35 the guide sleeve can be readily removed with the valve body and replaced.

The guide sleeve is provided with circumferential groove 37 extending downwards from the end of the passage 30 and passages 38 lead from the lowermost part of the circumferential groove to the valve body. By so locating the passages 38 at a lower level relatively to the valve body it is made possible to reduce to a minimum the length of the rod connecting the valve body 31 and its piston 32 which is of particular importance because thereby the danger that this small valve may break is materially reduced. On the other hand the symmetrically arranged holes 12 ensure uniform distribution of the pressure of the fluid on the valve body 5 which is important for the reliable operation of the valve. For protecting the valve against mud a sieve 39 is mounted in the circumferential groove and the plate 36 is provided with a tap 40 perforated like a sieve and enclosing the valve body.

To enable the fluid under pressure flowing to the controlling valve to be throttled, a throttle valve 41 is provided which for preventing any unauthorized adjustment is sunk in the bore leading to the passage 30. On the outside this bore is closed by a plug 42 which may be secured in position by lead sealing if desired. Providing a throttling valve in advance of the controlling valve permits of a still better accommodation of the latter to give pressure conditions and thus of a minimum wear of the packing faces.

In Fig. 7 of the drawings a pressure limiting valve is shown having a piston constructed in accordance with the invention, in which, however, no valve is arranged in the piston, but a space 43 is provided in the cover, which is connected with the high pressure side by the passage 30 and is closed on top by a diaphragm 48 under pressure which acts on a valve 45 shutting off the top side of the piston from passage 44 leading to the escape side of the controller, a packing being interposed between the rod of such valve and the diaphragm space. The valve body 3 is surrounded by a cage or shield 46 provided with openings and preferably tapering downwards towards the valve seat and so directing the fluid under pressure relatively to the valve body that it flows into the latter from top and closes it rapidly and reliably after the pressure has sunk to the valve corresponding to the adjustment. In the passage 30 a throttle valve 47 is provided by which the flow of the fluid under pressure to the space 43 can be throttled or shut off entirely so that the arrangement of a separate shutting off element is not necessary. The controller might also be derived from the automatic valve shown in Fig. 10. When such a non-return or automatic valve is used the piston constructed according to the invention offers all the advantages already described. The wide circumferential groove 20 in the piston communicates by a hole 60 located near the piston bottom with a space above the same, so that the condensate may penetrate to the lower sliding surface of the piston. As the fluid under pressure acts at all times on the inner piston open at its bottom side and on the valve body surrounded by the conical shield, shocks of the fluid under pressure are compensated.

A particular advantage of the construction according to the invention is that it may be applied to all kinds of controller casings. It may be provided in all throughgoing, corner, cross or other valves.

The construction of the piston according to the invention can also be used in valves for high pressures and for larger dimensions of the valves where the valve-body is provided with a relieving valve body. Such a construction in a non-return valve is shown in Fig. 8.

In the main valve 3 connected with the piston the relief valve body 59 is mounted. The connection of this valve body 59 with the piston is effected by a flange 61 on a stud 62 fast on the piston and having the same diameter as the relief valve seat. The valve body 3 which is suitably guided is again surrounded outside its seat by a shield 46 tapering downwards. The hollow piston forms again together with the guiding cylinder the braking space 9 and the second space 7 or 20 permitting of the packing by the condensate of the sliding surface through the open communication with the high pressure side of the controller.

In the cover of the controller there is again located the diaphragm 48 operating the governing valve 45, the diaphragm being operated by the fluid under pressure flowing through the passage 30. The governing valve 45 again shuts off the communication between the space above the piston and the passage 44 leading to the escape side of the controller.

Figure 9:
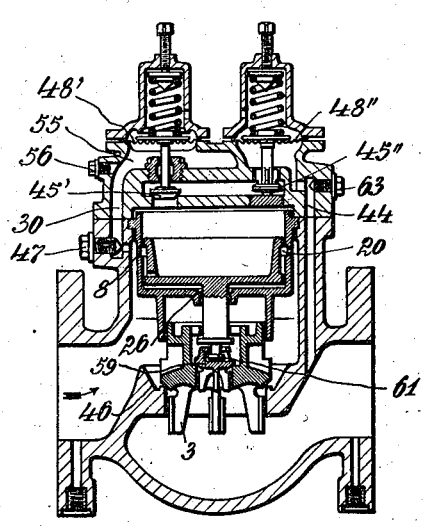
Figure 11:
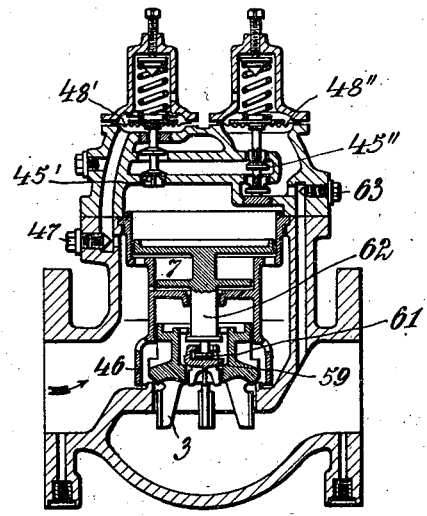

Also two governing valves 45' and 45" may be used as shown in Fig. 9, the seats of which are provided in a tubular part of the cover. One of the governing valves 45' is kept closed by a diaphragm 48' the otherwise closed space of which communicates only by a passage 30 adapted to be adjusted or shut off, with the valve space above the main valve 3, the other valve 45" is held in the open position by a diaphragm 48" under pressure, the space of which is in communication with the valve space below the valve 3 only by a passage 44 which is likewise adapted to be shut off. When the pressure rises to a higher value than corresponds to the pressure on the diaphragm of the governing valve 45' then this valve is raised, the pressure above the piston diminishes the piston, opens the small valve body 59 and this takes with it the main valve body 3 now relieved.

When the pressure falls below the predetermined value then the valve 45' closes, the pressure above the piston becomes again equal to the valve pressure, the flowing fluid under pressure closes the main valve body 3 owing to its being guided by the shield 46 and the piston follows with a small valve body 59 into the closed position owing to the excess of pressure on the stud reaching into the relief space.

When in the open position of the governing valve 48' and therefore when the main valve 3 is open, the pressure at the escape side of the valve rises so far that it overcomes the pressure acting on the diaphragm of the second governing valve 48'' and closes the latter, then again pressures are equalized above the piston and the main valve 3 closes in the manner above described.

In the constructional form shown in Fig. 8 as well as in that shown in Fig. 9 in the passage 30, leading to the diaphragm 48 (or 48' respectively) a throttling or shutting off valve 47 is provided as well as in the escape passage 44 leading from the valve 45 (or from the diaphragm 48'' respectively) a throttling or shutting off valve 63 is provided. By shutting off the valves 30 and 44 the valve becomes a shut off valve. Further in this case too in the cover a port 55 adapted to be closed by a plug 56 and leading into the space below the diaphragm 48 is provided, to which a pipe branched off from another point of the path of the fluid under pressure may be connected.

Figure 10:
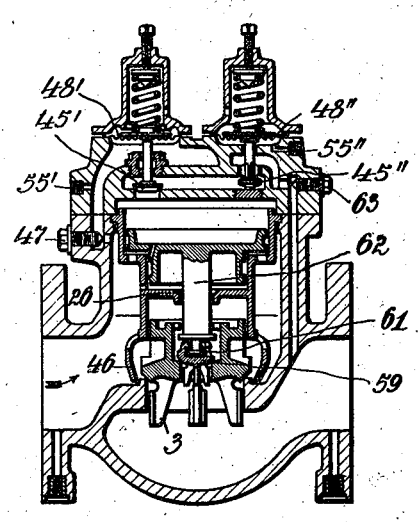

In Fig. 10 a further constructional form of such a non-return valve is shown in which another form of the piston and of the shield 46 is used and moreover a further port 55'' is provided, which permits to operate the diaphragm 48'' by a branch pipe connected to such port. Finally in Fig. 11 an analogous constructional form of such a valve is shown in which the governing valves 45' and 45'' are constructed as double seat sliding valves.

Claims:

1. In a pressure controlling valve the combination of a casing and a cover therefor and a valve seat in the casing, with a valve, a piston connected to such valve, means for supplying fluid under pressure from the first side of the said valve to one side of one end face of such piston, a guiding cylinder in the said casing for the said piston, a space arranged concentrically relatively to the said piston and enclosed by the piston and the cylindrical inner face of the guide cylinder, a dash pot comprising an end face of the piston and an end face of the guide cylinder and means for permanently connecting the said space and the interior of the dash pot in parallel to each other with the fluid under pressure on the second side of the controlling valve and for permitting to escape from the said space any fluid under pressure leaking thereinto from the said first side of the controlling valve to the said second side of the controlling valve.

2. In a pressure controlling valve the combination of a casing and a cover therefor and a valve seat in the casing with a valve, a piston connected to such valve, means for supplying fluid under pressure from the first side of the said valve to one side of one end face of such piston, a guiding cylinder in the said casing for the said piston, a space arranged concentrically relatively to the said piston and enclosed by the piston and the cylindrical inner face of the guide cylinder, a dash pot comprising an end face of the piston and an end face of the guide cylinder, and means for permanently connecting the said space and the interior of the dash pot in parallel to each other with the fluid under pressure on the second side of the controlling valve and for permitting to escape from the said space any fluid under pressure leaking thereinto from the said first side of the controlling valve to the said second side of the controlling valve such means comprising openings in the side wall of the guiding cylinder.

3. In a pressure controlling valve the combination of a casing and a cover therefor and a valve seat in the casing with a valve, a piston connected to such valve, means for supplying fluid under pressure from the first side of the said valve to one side of one end face of such piston, a guiding cylinder in the said casing for the said piston, a space formed by a circumferential recess in the side wall of the said piston and enclosed by the piston and the cylindrical inner face of the guide cylinder, a dash pot comprising an end face of the piston and an end face of the guide cylinder and means for permanently connecting the said space and the interior of the dash pot in parallel to each other with the fluid under pressure on the second side of the controlling valve and for permitting to escape from the said space any fluid under pressure leaking thereinto from the said first side of the controlling valve to the said second side of the controlling valve.

4. In a pressure controlling valve the combination of a casing and a cover therefor and a valve seat in the casing with a valve, a piston connected to such valve, means for supplying fluid under pressure from the first side of the said valve to one side of one end face of such piston, a guiding cylinder in the said casing for the said piston, the guide cylinder and the piston comprising each two concentric parts cooperating with each other at least one of the piston parts being provided with a space formed by circumferential recess in the side wall of such piston part, and enclosed by the piston and the cylindrical inner face of the corresponding guide cylinder part, one end face of one of the cylinder parts and one end face of the corresponding piston part being adapted to act in conjunction with each other as a dash pot and means for permanently connecting the said space and the interior of the dash pot in parallel to each other with the fluid under pressure on the second side of the controlling valve and for permitting to escape from the said space any fluid under pressure leaking thereinto from the said first side of the controlling valve to the said second side of the controlling valve.

5. In a pressure controlling valve the combination of a casing and a cover therefor and a valve seat in the casing, a shield surrounding and connected at one end to the said valve seat and open at its other end this other end being in permanently open communication with the fluid under pressure on the first side of the control valve with a valve, a piston connected to such valve, means for supplying fluid under pressure from the first side of the said valve to one side of one end face of such piston, a guiding cylinder in the said casing for the said piston, a space arranged concentrically relatively to the said piston and enclosed by the piston and the cylindrical inner face of the guide cylinder, a dash pot comprising an end face of the piston and an end face of the guide cylinder and means for permanently connecting the said space and the interior of the dash pot in parallel to each other with the fluid under pressure on the second side of the controlling valve and for permitting to escape from the said space any fluid under pressure leaking thereinto from the said first side of the controlling valve to the said second side of the controlling valve.

6. In a pressure controlling valve the combination of a casing and a cover therefor and a valve seat in the casing a frustro conical shield surrounding and connected at its narrower end to the said valve seat and open at its larger end this larger end being in permanently open communication with the fluid under pressure on the first side of the control valve with a valve, a piston connected to such valve, means for supplying fluid under pressure from the first side of the said valve to one side of one end face of such piston, a guiding cylinder in the said casing for the said piston, a space arranged concentrically relatively to the said piston and enclosed by the piston and the cylindrical inner face of the guide cylinder, a dash pot comprising an end face of the piston and an end face of the guide cylinder and means for permanently connecting the said space and the interior of the dash pot in parallel to each other with the fluid under pressure on the second side of the controlling valve and for permitting to escape from the said space any fluid under pressure leaking thereinto from the said first side of the controlling valve to the said second side of the controlling valve.

7. In a pressure controlling valve the combination of a casing and a cover therefor and a valve seat in the casing with a valve, a piston connected to such valve by a piston rod, means for supplying fluid under pressure from the first side of the said valve to one side of one end face of such piston, a guiding cylinder in the said casing for the said piston, a guide for the said piston rod on the said piston casing, a circumferential groove surrounding the piston rod within the said piston rod guide, such groove being in permanently open communication with the fluid under pressure on the second side of the control valve, a space arranged concentrically relatively to the said piston and enclosed by the piston and the cylindrical inner face of the guide cylinder, a dash pot comprising an end face of the piston and an end face of the guide cylinder and means for permanently connecting the said space and the interior of the dash pot in parallel to each other with the fluid under pressure on the second side of the controlling valve and for permitting to escape from the said space any fluid under pressure leaking thereinto from the said first side of the controlling valve to the said second side of the controlling valve.

8. In a pressure controlling valve the combination of a casing and a cover therefor and a valve seat in the casing with a valve, a piston connected to such valve, means for supplying fluid under pressure from the first side of the said valve to one side of the one end face of such piston, a guiding cylinder in said casing for the said piston, a space arranged concentrically relatively to the said piston and enclosed by the piston and the cylindrical inner face of the guide cylinder, a dash pot comprising an end face of the piston and an end face of the guide cylinder and means for permanently connecting the said space and the interior of the dash pot in parallel to each other with the fluid under pressure on the second side of the controlling valve and for permitting to escape from the said space any fluid under pressure leaking thereinto from the said first side of the controlling valve to the said second side of the controlling valve, and a safety valve mounted on the said cover and adapted to limit the fluid pressure below the cover the said safety valve being laterally enlarged beyond its seat and adapted to form an annular space between it and the valve seat body.

9. In a pressure controlling valve the combination of a casing and a cover therefor and a valve seat in the casing with a valve, a piston connected to such valve, means for supplying fluid under pressure from the first side of the said valve to one side of one end face of such piston, a guiding cylinder in the said casing for the said piston, a space arranged concentrically relatively to the said piston and enclosed by the piston and the cylindrical inner face of the guide cylinder, a dash pot comprising an end face of the piston and an end face of the guide cylinder and means for permanently connecting the said space and the interior of the dash pot in parallel to each other with the fluid under pressure on the second side of the controlling valve and for permitting to escape from the said space any fluid under pressure leaking thereinto from the said first side of the controlling valve to the said second side of the controlling valve, and a safety valve mounted on the said cover and adapted to limit the fluid pressure below the cover the said safety valve comprising a valve body provided with a laterally projecting ring and a valve seat provided with a ring axially projecting from it and adapted to embrace the said ring on the valve body and means for axially adjusting at least one of the said rings.

10. In a pressure controlling valve the combination of a casing and a cover therefor and a valve seat in the casing with a valve, a piston connected to such valve, means for supplying fluid under pressure from the first side of the said valve to one side of one end face of such piston, a guiding cylinder in the said casing for the said piston, a space arranged concentrically relatively to the said piston and enclosed by the piston and the cylindrical inner face of the guide cylinder, a dash pot comprising an end face of the piston and an end face of the guide cylinder and means for permanently connecting the said space and the interior of the dash pot in parallel to each other with the fluid under pressure on the second side of the controlling valve and for permitting to escape from the said space any fluid under pressure leaking thereinto from the said first side of the controlling valve to the said second side of the controlling valve, and a safety valve mounted on the said cover and adapted to limit the fluid pressure below the cover the said safety valve being provided with a disc adapted to be acted upon by a source of pressure a guiding cylinder for such disc and means for axially adjusting the last named guiding cylinder.

11. In a pressure controlling valve the combination of a casing and a cover therefor and a valve seat in the casing with a valve, a piston connected to such valve, means for supplying fluid under pressure from the first side of the said valve to one side of one end face of such piston, such means comprising a passage, a valve in such passage and a valve seat, a guide cylinder for such valve, a circumferential groove on this guide cylinder into which leads the said passage, this groove ending in proximity to the last named valve seat, ports leading from the circumferential groove to a point adjacent to the valve, a guiding cylinder in the said casing for the said piston, a space arranged concentrically relatively to the said piston and enclosed by the piston and the cylindrical inner face of the guide cylinder, a dash pot comprising an end face of the piston and an end face of the guide cylinder and means for permanently connecting the said space and the interior of the dash pot in parallel to each other with the fluid under pressure on the second side of the controlling valve and for permitting to escape from the said space any fluid under pressure leaking thereinto from the said first side of the controlling valve to the said second side of the controlling valve.

12. In a pressure controlling valve the combination of a casing and a cover therefor and a valve seat in the casing with a valve, a piston connected to such valve, means for supplying fluid under pressure from the first side of the said valve to one side of one end face of such piston such means comprising a passage, a valve in such passage and a valve seat, a guide cylinder for such valve, a circumferential groove on this guide cylinder into which leads the said passage, this groove ending in proximity to the last named valve seat ports leading from the circumferential groove to a point adjacent to the valve, a sleeve mounted in the said circumferential groove and a perforated protecting cap enclosing the valve body, a guiding cylinder in the said casing for the said piston, a space arranged concentrically relatively to the said piston and enclosed by the piston and the cylindrical inner face of the guide cylinder, a dash pot comprising an end face of the piston and an end face of the guide cylinder and means for permanently connecting the said space and the interior of the dash pot in parallel to each other with the fluid under pressure on the second side of the controlling valve and for permitting to escape from the said space any fluid under pressure leaking thereinto from the said first side of the controlling valve to the said second side of the controlling valve.

13. In a pressure controlling valve the combination of a casing and a cover therefor and a valve seat in the casing with a valve, a piston connected to such valve through the medium of a relief valve the body of such relief valve being connected with play with the piston rod and having its seat in the said valve, means for supplying fluid under pressure from the first side of the said valve to one side of one end face of such piston, a guiding cylinder in the said casing for the said piston, a space arranged concentrically relatively to the said piston and enclosed by the piston and the cylindrical inner face of the guide cylinder, a dash pot comprising an end face of the piston and an end face of the guide cylinder and means for permanently connecting the said space and the interior of the dash pot in parallel to each other with the fluid under pressure on the second side of the controlling valve and for permitting to escape from the said space any fluid under pressure leaking thereinto from the said first side of the controlling valve to the said second side of the controlling valve.

In testimony whereof I have signed my name to this specification.

OTTO ROSCHANEK.